United States Patent Office 3,535,423
Patented Oct. 20, 1970

3,535,423
WETTABLE POWDER PESTICIDE CONCENTRATE
Eugene P. Ordas, Gary, Ind., assignor to Velsicol Chemical Corporation, Chicago, Ill., a corporation of Delaware
No Drawing. Filed Aug. 12, 1965, Ser. No. 479,292
Int. Cl. A01n 17/08
U.S. Cl. 424—176                                 1 Claim

ABSTRACT OF THE DISCLOSURE

Pesticidal compositions comprising either soluble starch or sugar and a water soluble solid pesticide.

---

This invention relates to pesticidal compositions and more particularly to water dispersible powdered pesticide concentrates.

The spraying of aqueous dispersions or dilutions of pesticidally active compounds is frequently a preferred method of their application. Many of the pesticidally active compounds such as carbaryl, atrazine and dichlone have solubilities too low in water or the commonly used aromatic or aliphatic solvents to permit their formulation as liquid concentrates to be either practical or economical. One method of formulating these pesticidally active compounds in a form from which aqueous dispersions or dilutions can be readily made is to prepare wettable powder formulations of these materials.

Wettable powders are frequently prepared by dissolving pesticidally active compounds in sufficient solvent with or without heating to give a solution and spraying the resulting solution onto a solid carrier or diluent. Alternatively, pesticidally active ingredients which are solid and of a friable nature may be blended and ground with inexpensive mineral diluents. The carriers generally used for wettable powders are sorbent inorganic materials commonly of mineral origin such as the kaolinites, montmorillonites, attapulgites, diatomaceous earths and vermiculites. Diluents generally used in toxicant formulations are such inert solids as talc, pyrophyllite, frianite, pumice and the like.

The presently used wettable powder formulations have a number of serious disadvantages which detract from their usefulness and acceptance. The powders tend to settle out of suspension too rapidly unless very finely ground. The particles of inert and active ingredients tend to agglomerate and clog spray equipment, particularly spray nozzles. The inert carriers and diluents which are generally of an abrasive synthetic silica, silicate, or natural mineral or clay origin tend to erode or abrade and wear away the spray equipment and particularly the nozzle orifices resulting in serious variation in the nozzle size and capacity. Many of the mineral carriers catalytically decompose certain of the active ingredients and therefore must be deactivated to assure product stability.

Thus there is a presently existing need for a formulation of water insoluble pesticides in the form of a water dispersible wettable powder which is free from the problems of the presently utilized wettable powder formulations, such as agglomeration, the tendency to clog, erode and abrade spray equipment and those problems concerning chemical stability.

Therefore, it is one object of the present invention to provide water dispersible pesticide concentrates in the form of a powder.

It is another object of the present invention to provide a water dispersible pesticide concentrate from which the solid particles resist settling out or agglomerating and thus hinder the clogging or eroding of application equipment.

Another object of the present invention is to provide a water dispersible pesticide concentrate in the form of a powder which is chemically inert to the active ingredient.

Still another object of the present invention is to provide pesticide concentrates whose ingredients except for the pesticide are readily soluble in water and are nontoxic.

These and other objects and advantages of the present invention will be more readily apparent from the following description.

The above objects are accomplished by the present invention. By means of this invention, a highly useful, water dispersible, powdered pesticide concentrate composition is provided from a water insoluble, solid pesticide wherein the pesticidal usefulness of the pesticide is retained. The water dispersible, wettable powder, pesticide concentrates of the present invention comprise water insoluble, solid pesticides and as a water soluble, solid diluent therefor, sugar or soluble starch.

Unlike the wettable powder pesticide formulations heretofore available, the compositions of the present invention, and particularly the diluents used herein are not of silica, silicate or clay origin, and do not agglomerate nor clog, abrade or erode spray apparatus, or other types of pesticide application equipment. The compositions of the present invention are entirely dispersed in water. All of the ingredients except the water insoluble, solid pesticide are soluble and remain in solution in water. The water insoluble, solid pesticide itself is held in suspension in the solution, and hence does not settle or otherwise separate out of the solution. Moreover, the diluents utilized in the compositions of the present invention do not catalytically decompose or otherwise detoxify the pesticide ingredient. For these and other reasons the use of the pesticide concentrate compositions of the present invention is particularly advantageous and provides a marked improvement over the presently available wettable powder pesticide concentrates.

The terms "insoluble" as used herein denotes a very low solubility in water such that aqueous solutions of the material are impractical. The term "soluble" as used herein, on the other hand, denotes a solubility in water such that the material readily dissolves in water in practical proportions, this solubility generally being greater than 0.3 gram per milliliter of water at 20° C.

As heretofore described, the suitable diluents are water soluble, solid materials such as sugar and soluble starch. Exemplary of the water soluble, inert solid diluents described above are sucrose, soluble starch, sugar, and the like.

Surfactants or surface-active agents are used in the compositions of the present invention to improve the wettability, dispersibility and suspensibility of the compositions of the present invention in water. The surface-active agents can be of the anionic, or nonionic type. Typical examples of such surface-active agents are sodium lauryl sulfate, sodium 2-ethylhexyl sulfate, sodium alkylbenzenesufonate, sodium naphthalenesulfonate, sodium akylnaphthalenesulfonate, sodium sulfosuccinate, sodium oleic acid sulfonate, sodium castor oil sulfonate, glycerol monostearate containing a soap (or a sodium fatty alcohol sulfate), sodium salt of ligninsulfonic acid, polyoxyethylene fatty alcohol ethers, polyglycol fatty acid esters, polyoxyethylene modified fatty acid esters, polyoxyethylene-polyol fatty acid esters, polyoxypropylene fatty alcohol ethers, polypropylene glycol fatty acid esters, polyoxypropylene modified fatty acid esters, polyoxypropylenepolyol fatty acid esters, polyol fatty acid monoesters, di- and higher polyhydric alcohol fatty acid esters, oxidized fatty oils, alkylated aryl polyether alcohols such as the condensation product of diamylphenol with ethylene oxide, nonylphenol with ethylene oxide, and the like. To impart suitable handling characteristics such as good flowability and freedom from caking of the dry concentrate it is preferred that the surfactants be dry and in a powdered form.

Exemplary of the water insoluble, solid pesticides which can be used in the formulation of the present invention are the insecticides, herbicides, fungicides, acaricides, nematocides, defoliants, dessicants, plant growth inhibitors and the like, which melt above about 80° C. and preferably are friable in nature. Among the insecticides which are suitable for formulation according to the composition of the present invention are the halogenated compounds such as DDT, methoxychlor, TDE, lindane, chlordane, and its isomers melting 103–4° C. and 107–8° C., isobenzan, aldrin, dieldrin, heptachlor, endrin, mirex, and the like; organic carbamate compounds such as carbaryl, and the like; and organic sulfur compounds such as phenothiazine, phenoxathin, and the like.

Typical examples of fungicidal chemical compounds which can be used as an ingredient in the composition of this invention are ferbam, zineb, ziram, thiram, chloranil, dichlone, hexachlorobenzene, PCNB, PCP, PMA, glyodin, and the like; while typical examples of acaricides are ovex and zineb, several of which are also insecticides or fungicides.

The herbicides, defoliants, dessicants, and plant growth inhibitors which can be used as an ingredient in the compositions of the present inventon can include chlorophenoxy herbicides such as 2,4–D, 2,4,5–T, MCPA, MCPB, 4(2,4–DB), and the like; carbamate herbicides such as swep, and the like; substituted urea herbicides such as dichloral urea, fenuron, monuron, diuron, linuron, neburon, and the like; symmetrical triazine herbicides such as simazine, atrazine, trietazine, simetone, prometone, propazine, and the like; chlorinated benzoic acid and phenylacetic acid herbicides such as 2,3,6–TBA, 2,3,5,6–TBA, dicamba, tricamba, amiben, fenac, 2-methoxy-3,6-dichlorophenylacetic acid, 3-methoxy-2,6-dichlorophenylacetic acid, 2 - methoxy - 3,5,6 - trichlorophenylacetic acid, and the like; and such compounds as O, S - dimethyl tetrachlorothioterephthalate, methyl 2,3,5,6 - tetrachloro - N-methoxy-N-methylterephthalamate, 2 - [(4-chloro-o-tolyl)-oxy]-N-methoxyacetamide, dimethyl 2,3,5,6 - tetrachloroterephthalate, diphenamid, trifluralin, solan, dicryl, and the like.

The water dispersible, wettable powder pesticide concentrates of the present invention can contain from about 10% to about 90% of a water insoluble, solid pesticide melting above about 80° C. and from about 10% to about 90% of a water soluble, inert, solid diluent as described above. Preferably the composition of the present invention contains from about 50% to about 90% of a pesticidally active compound as described above, from about 10% to about 50% of a water soluble inert solid as described above and including from 0.1% to about 10% of a surfactant as heretofore described. In a preferred embodiment of the present invention the composition can contain from about 10% to about 85% of the pesticidally active ingredient, from about 15% to about 90% of the suitable solid diluent, from about 0.1% to about 6% of a dispersant and from 0.1% to 2% of a wetting agent. It will be readily understood by those skilled in the art that the above proportions of ingredients includes the concentrated formulations containing from about 70 to about 85% of the pesticidally active compound particularly suitable for handling and transporting to the site of the pest infestation, and also dilute formulations suitable for direction application at the site of the pest infestation.

The composition of the present invention can be readily prepared by mixing the pesticidally active compound, the inert diluent, and the dispersing agent in suitable blending equipment such as a tumbler-blender. Alternatively or in addition, other types of equipment such as ribbon-blenders, pulverizers, fluid-energy mills, comminutors, grinding mills and the like can be used to prepare the compositions of the present invention. Wetting agents can be added to the formulation, if desired, before, during or after the mixing and grinding are completed. It is preferable that the composition, or at least the pesticide, is ground, milled and/or pulverized to form an admixture whose particles are all less than 25 microns in size, 80–90% of these particles being between 5 and 10 microns in size.

The following examples are illustrative of the water dispersible, wettable powder pesticide concentrate compositions of the present invention. In each of these examples the first three ingredients are blended in a tumbler-blender and are then fed into a pulverizer and ground using a 0.045 screen. The formulation is then blended for 15 minutes in a ribbon-blender and ground in an air mill to a particle size of less than 25 microns, 80% less than 10 microns. The last ingredient is then blended into the formulation.

EXAMPLE 1

|  | Percent |
|---|---|
| Dieldrin | 80 |
| Sucrose | 16 |
| Polyvinyl pyrollidone | 4 |
| Substituted aromatic sulfonic acid [1] | 3 |
| Pine wood lignin sulfonate | 2 |

[1] A solid mixture of 40% dodecylbenzene sodium sulfate, 59% sodium sulfate and 1% water, Santomerse No. 1 marketed by Monsanto Chemical Co.

EXAMPLE 2

|  | Percent |
|---|---|
| Carbaryl | 75 |
| Soluble starch | 22 |
| Sodium dialkylnaphthalene sulfonate | 2 |
| Sodium salt of polymerized alkyl aryl sulfonic acid | 1 |

EXAMPLE 3

|  | Percent |
|---|---|
| 1,3-dichloronaphthoquinone | 85 |
| Soluble starch | 10 |
| Tetrasodium N-(1,2-dicarboxyethyl) - N - octyldecyl-sulfosuccinamate | 2 |
| Sodium lignin sulfonate | 3 |

EXAMPLE 4

|  | Percent |
|---|---|
| O,S-dimethyl tetrachlorothioterephthalate (95.3%) | 78.7 |
| Sugar | 16.2 |
| Sodium lignin sulfonate | 4 |
| Sodium dialkylnaphthalene sulfonate | 1 |

EXAMPLE 5

|  | Percent |
|---|---|
| O,S-dimethyl tetrachlorothioterephthalate (95.3%) | 76.7 |
| Sucrose | 15.6 |
| sodium lignin sulfonate | 3.9 |
| Alkylphenyl ether of polyethylene glycol | 1.9 |
| Sodium dialkylnaphthalene sulfonate | 1.9 |

The foregoing examples illustrate the various types of pesticidally active compounds which can be included in the compositions of the present invention. Essentially, all water insoluble pesticides which are crystalline, friable, and/or have melting points above about 80° C. are useful in the compositions of the present invention. It is also helpful, although not required, that the inert carriers be of a crystalline or friable nature to permit grinding and the preparation of homogeneous mixtures. The compositions of the present invention have exceptionally favorable characteristics of dispersibility and the like. For example, the composition of example 5 was dispersed to a concentration of 10% by weight in water and formed a stable aqueous dispersion useful for application to weeds and crops by spraying with conventional spray application equipment.

I claim:

1. A wettable powder pesticide concentrate comprising from about 10% to about 90% of a water insoluble pesticide; from about 10% to about 90% of a water soluble solid diluent therefor selected from the group consisting of soluble starch and sugar; and from about 0.1 to 10% of a surfactant.

References Cited

UNITED STATES PATENTS

| | | |
|---|---|---|
| 1,868,715 | 7/1932 | Mochalle _____ 167—42 |
| 2,000,807 | 5/1935 | Wig _____ 252—363.5 |
| 2,203,257 | 6/1940 | Whyte _____ 252—363.5 |
| 2,376,656 | 5/1945 | Buchanan _____ 252—363.5 |
| 2,949,428 | 8/1960 | Leo _____ 252—363.5 |
| 2,992,188 | 7/1961 | Miller _____ 252—363.5 |
| 3,004,922 | 10/1961 | Buer _____ 252—363.5 |
| 1,530,121 | 3/1925 | Hooper. |
| 3,008,869 | 12/1961 | Hopkins. |

STANLEY J. FRIEDMAN, Primary Examiner

U.S. Cl. X.R.

71—65, 79; 424—180